April 23, 1929.  E. S. ZIEGLER  1,710,252
VEHICLE BODY
Filed July 29, 1927   6 Sheets-Sheet 1
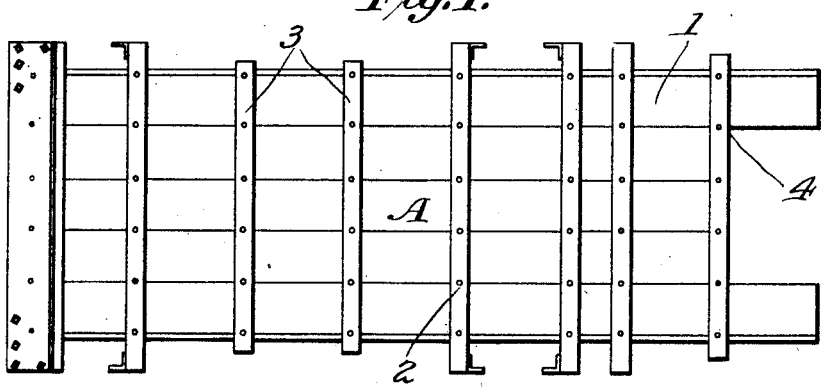
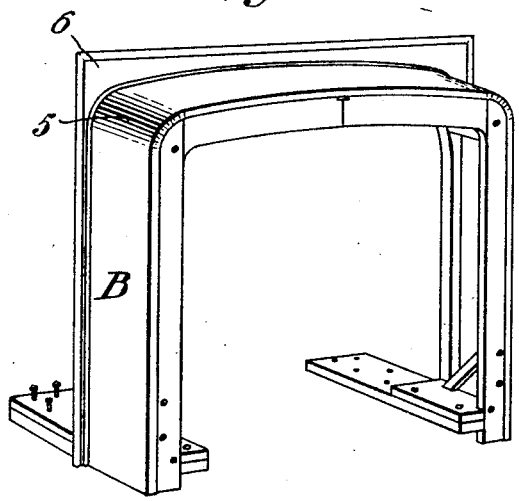
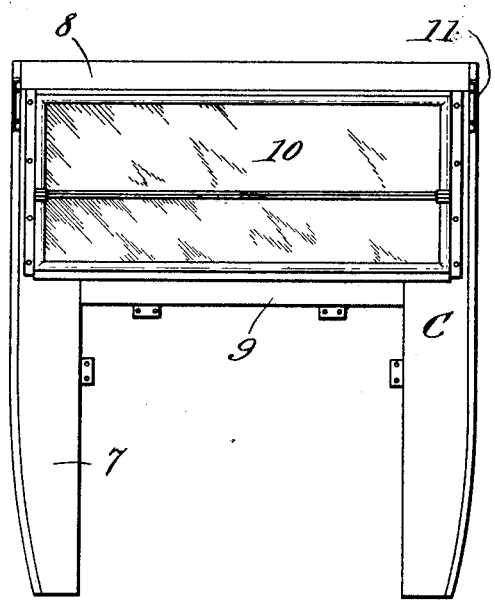
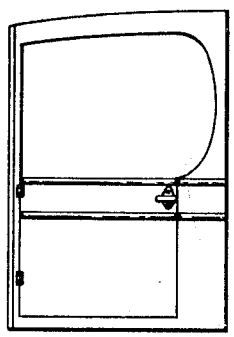
Inventor:
Edwin S. Ziegler,
by Spear, Middleton, Donaldson, Haep
Attys.

April 23, 1929. E. S. ZIEGLER 1,710,252
VEHICLE BODY
Filed July 29, 1927 6 Sheets-Sheet 2
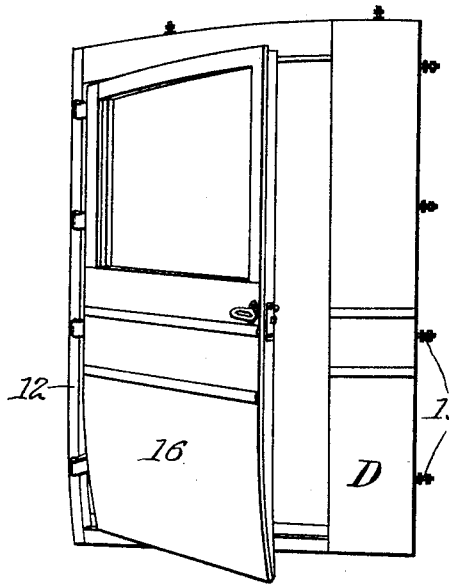
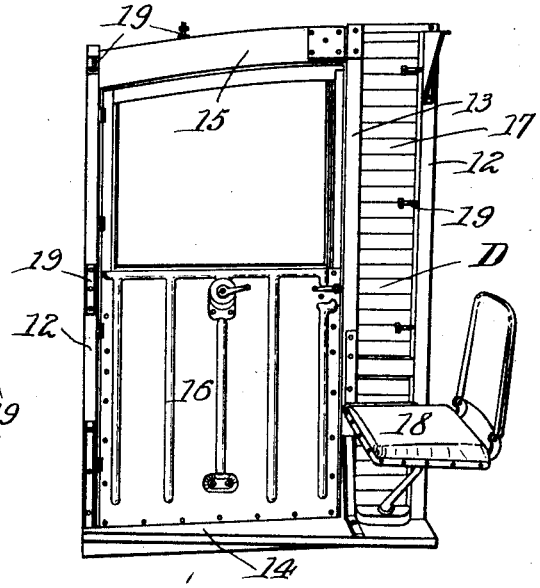
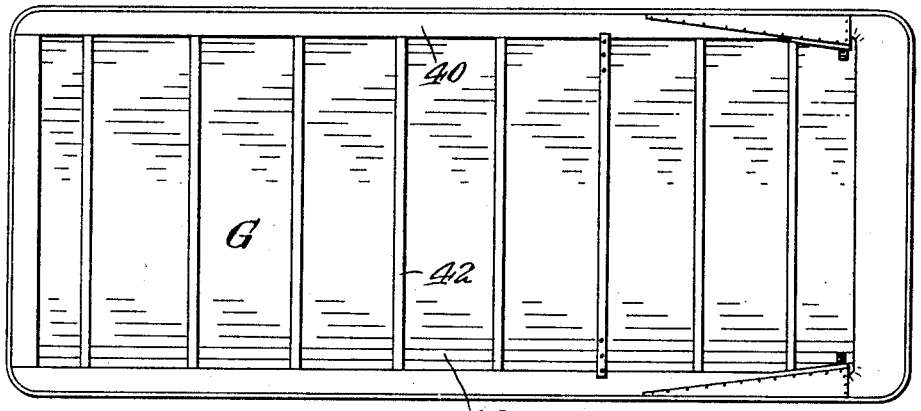
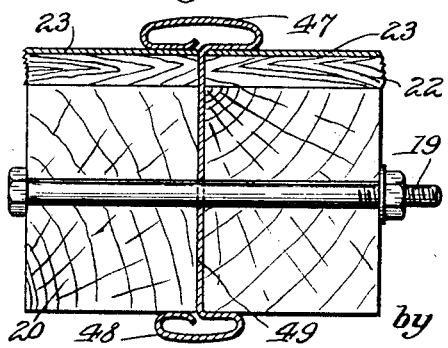
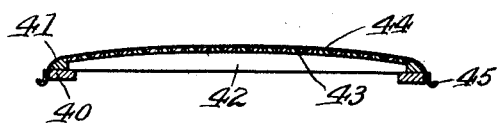
Inventor:
Edwin S. Ziegler,
by Spear, Middleton Donaldson, Hall
Attys.

April 23, 1929.  E. S. ZIEGLER  1,710,252
VEHICLE BODY
Filed July 29, 1927  6 Sheets-Sheet 3
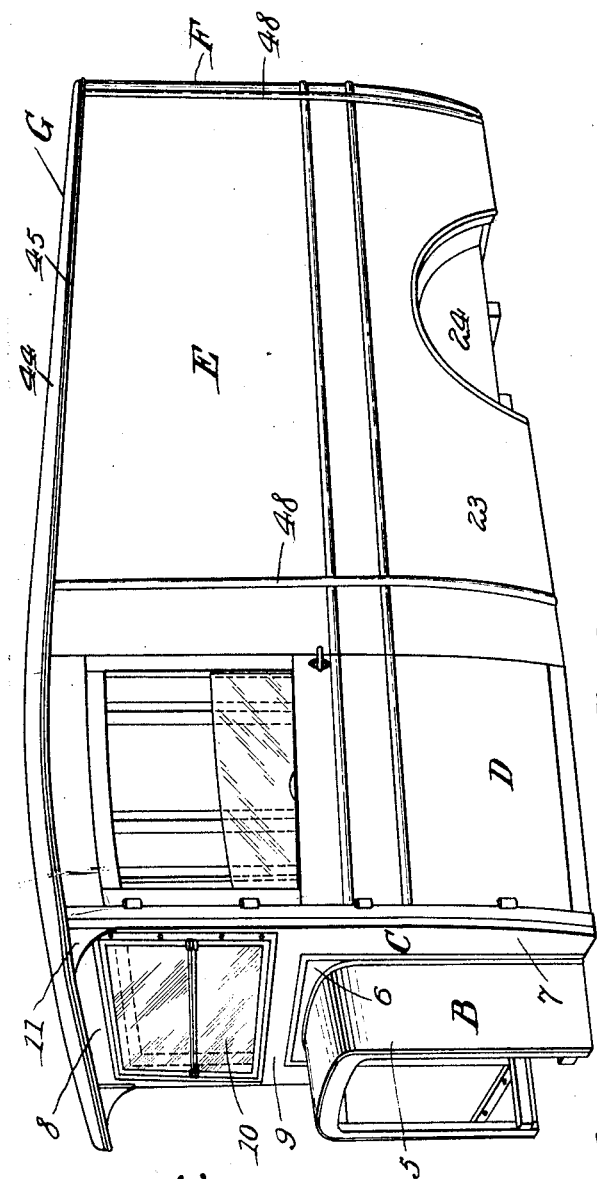
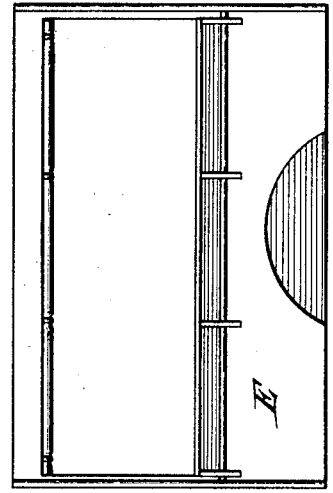
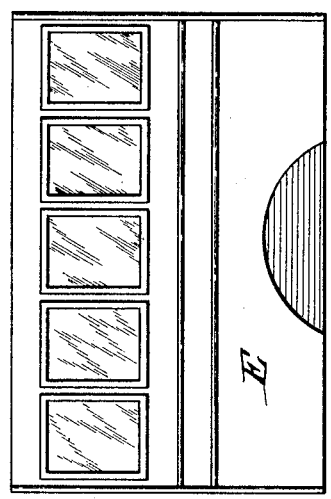
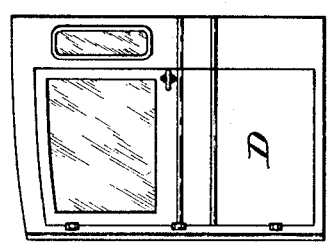
Inventor:
Edwin S. Ziegler,
by Spear, Middleton, Donaldson & Hall
Attys.

April 23, 1929.  E. S. ZIEGLER  1,710,252
VEHICLE BODY
Filed July 29, 1927  6 Sheets-Sheet 4

Inventor:
Edwin S. Ziegler,
by Spear, Middleton, Donaldson & Hall
Attys.

April 23, 1929. E. S. ZIEGLER 1,710,252
VEHICLE BODY
Filed July 29, 1927   6 Sheets-Sheet 5
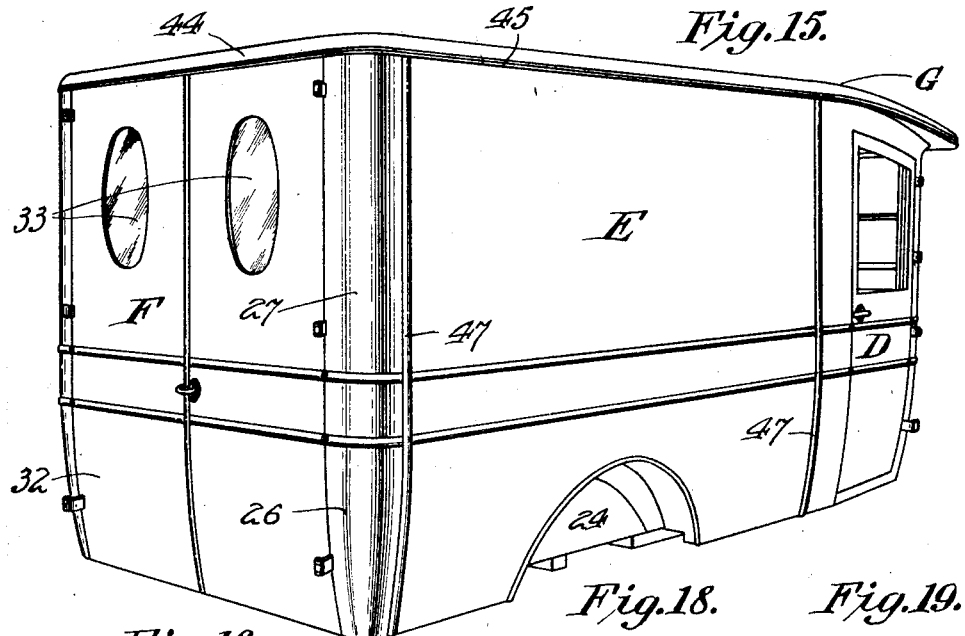
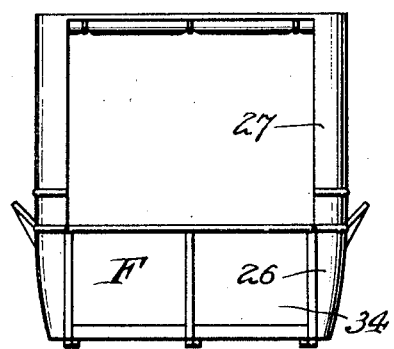
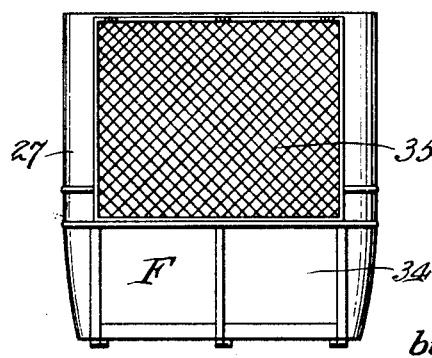
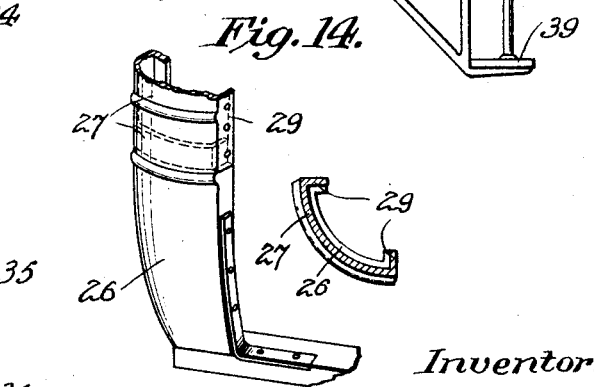
Inventor:
Edwin S. Ziegler,
by Spear, Middleton, Donaldson & Hael
Attys.

Inventor:
Edwin S. Ziegler,
by Spear, Middleton Donaldson & Hall
Attys.

Patented Apr. 23, 1929.

1,710,252

UNITED STATES PATENT OFFICE.

EDWIN S. ZIEGLER, OF YORK, PENNSYLVANIA.

VEHICLE BODY.

Application filed July 29, 1927. Serial No. 209,321.

My present invention relates to automotive vehicle bodies and more particularly to a standardization of parts thereof, so that with a comparatively few unitary parts, a series of different types of vehicles may be built therefrom.

The principal object of the invention is the provision of a series of vehicle bodies which have interchangeable units or sections of a standard nature, so that a body manufacturer will not be required to carry in stock several hundred types of completed bodies according to the purpose for which they are intended, as is the case with some vehicle body manufacturers, but on the other hand, such manufacturer may have on hand only a comparatively few standard body units or sections from which, through various combinations, various and sundry body types may be constructed and built.

From the consumer's viewpoint, such a system has decided advantages. One such item is that of repairs. Where through accident or the like a body panel, a rear section, a top or a front section or the like has been damaged, it will merely be necessary to order from the manufacturer a spare section to replace that damaged. The spare section may be attached simply and quickly without requiring the vehicle to be laid up in the shop for any extended period of time.

Still another object and advantage which accrues to the purchaser or owner of such a vehicle is that by purchasing a few spare and different sections he may have to all intents and purposes several types of vehicle bodies. For instance, by an interchange of front door sections, the vehicle may be converted from an open to a closed cab type. This is extremely desirable where such a vehicle is to be used through several seasons.

Again, the same body may be used on trucks or chassis of different makes by a mere interchange of cowl and wheel house sections.

Again, from a dealer's or distributor's standpoint, standard sections or units are carried in stock at a great saving of space instead of carrying a large assortment of completed bodies. From this stock of standard sections or units various completed bodies may be assembled to meet various vocational requirements, thus giving prompt service to his customers.

Again, due to the completeness of design and the flexibility or adaptability of same by simply adapting the cowl or dash assembly B in windshield section C, Figure 6, the body is adapted to various makes of chassis and by simply adjusting the wheel pocket No. 24 in section E, Figure 6, the body is adapted to various wheel bases of the different make chassis.

Therefore, the invention contemplates the provision of interchangeable body parts of different characters for the production of bodies of different types, and likewise the provision of such parts for replacement purposes.

The invention further consists in the construction, combination and arrangement of parts whereby the invention is effected as shown and described.

In the drawings which show diagrammatic embodiments of my invention:—

Fig. 1 is a bottom plan view of a bottom section.

Fig. 2 is perspective of a cowl section.

Fig. 3 is a front view of a windshield section.

Fig. 4 is a perspective of the outside of a cab door section.

Fig. 5 is an inside view of a cab door section.

Fig. 6 is a perspective of a complete vehicle body.

Fig. 7 is a diagrammatic side view of a modified form of cab section.

Fig. 8 is a diagrammatic side view of a modified form of cab section.

Fig. 9 is a diagrammatic side view of a modified form of side section.

Fig. 10 is a diagrammatic side view of a modified form of body section.

Fig. 14 is a detail of the lower rear corner section.

Fig. 15 is a perspective view of a vehicle body.

Fig. 16 is a diagrammatic view of a modified rear section.

Fig. 17 is a diagrammatic view of a modified rear section.

Fig. 18 is a diagrammatic view of a modified rear section.

Fig. 19 is a diagrammatic side view of the rear section of Fig. 18.

Fig. 20 is a bottom plan view of the top section.

Fig. 21 is a sectional view of the top section.

Fig. 22 is a sectional view of the joint covering element.

Figure 11:
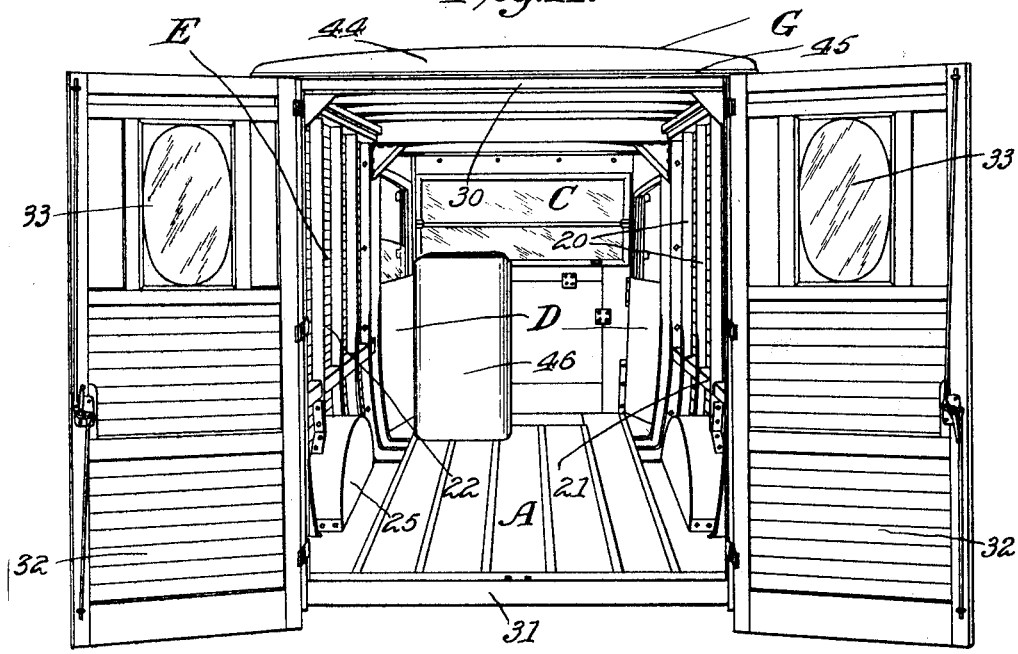
Fig. 11 is an inside perspective of a vehicle body.
Figure 12:
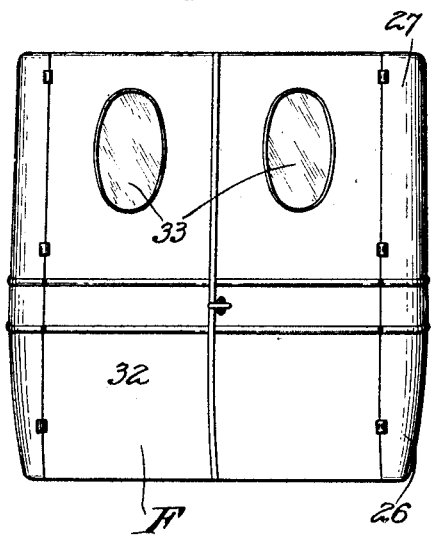
Fig. 12 is an outside view of a rear section.
Figure 13:
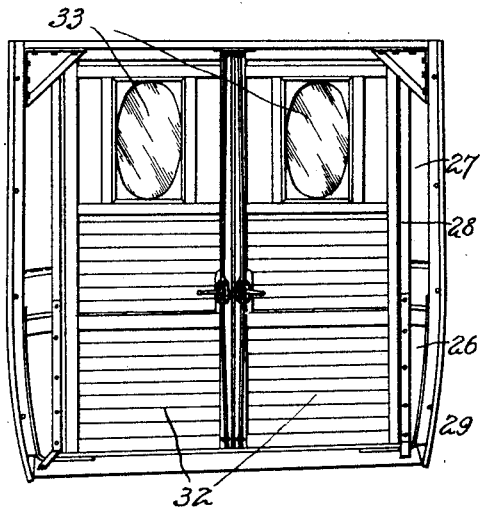
Fig. 13 is an inside view of a rear section.

I will now describe with particularity, the embodiment shown, which relates to the body of a vehicle only and does not include the vehicle chassis, as that construction forms no part of this invention.

The body bottom A may consist of flooring 1 secured together by main transversals 2. Intermediate shorter transversals 3 are provided in order that clearance may be had for the vehicle wheels. The longer transversals support the side panel sections, as will be more fully hereinafter described. A cut away section 4 appears at the front end of the bottom to clear the engine carried by the chassis (not shown).

It is to be understood that bottoms as above described may be made in different lengths to suit the trade requirements but in all forms, substantially the above construction adhered to.

Mounted upon the front of the bottom section A, is provided a cowl section B consisting of a more or less rounded portion 5 adapted to conform with the hood (not shown) of the engine used, and having at the rear thereof a flanged portion 6, the outline of which conforms to and closes a similar opening in a windshield section C referred to later. Obviously, other cowl sections may be used which conform to the outline of the part 6, but which have varied forms of hood sections 5, depending on the design of the chassis used.

A typical windshield section C is shown to consist of uprights 7 joined at the top by member 8 and below at 9 to receive the windshield proper 10. An opening in the front of this section below the windshield is adapted to be closed by the dash adapter and cowl section B as above described. Front brace supports 11 are provided to join and support a top section.

Directly in rear of the windshield section C, I provide front door sections D. These sections constitute a front upright or standard 12, which with upright 13 and cross members 14 and 15, form a frame to which a door 16 is hung. Due to the fact that this entire section assembly is made at the factory, the door fits its frame exactly and no fitting or adjusting need be made when the part reaches the customer. This is particularly desirable in replacements.

A short side panel 17 completes the section. In all the sections, there is provided a sheet metal covering to give a finished appearance to the whole and to more completely reenforce the parts.

Where desired a folding seat 18 may be mounted onto the uprights of the panel 17.

Suitable bolts and other fastening members 19 are provided to secure sections C and D together when assembling.

In Fig. 6 the relation of these parts is clearly shown.

A great many manufacturers require special designs in door sections, so that I have shown in Figs. 7 and 8 other forms of sections C, both of which are to be fitted as above described and which are interchangeable with the section particularly described. These are referred to as mere types.

Immediately adjacent the front door sections D, side sections E are provided. These sections may be of various types such as those shown in Figs. 6, 9 and 10. The general details of construction are shown in Fig. 11, to consist of the usual uprights 20, cross stringers 21 and outside stripping 22, to which is applied as in the other section a metal covering 23. Wheel pockets 24, in themselves separate units, fit into these sections to allow wheel clearance. As in section D, attaching bolts are provided in the uprights for securing the section to its neighbor.

A rear closure section F consists of a corner part 26 preferably of cast metal or pressed steel, to which is attached an upper extension consisting of a metal covering 27 secured to the two wooden uprights 28. Corners 26 have cast integral therewith wings 29, to which the uprights 28 are fastened. Top and bottom sills 30 and 31 tie the uprights together and give a rigid support for the top and bottom sections and produce a completed rear end section with which are fitted double doors, drop tailgate, etc.

The cast portion 26 is of decided advantage. It has been found from experience that the lower rear edge of the body is subject to more blows and knocks than any other portion. As a result, it is that portion of the body which first wears out. By constructing the lower portion of this rear corner of a cast section, it will withstand more than usual wear and yet maintain a neat finished appearance.

Doors 32 having windows 33 are hung from the side uprights 28. As in the case of the front door sections D, the entire section assembled is to be used and shipped as such. This being the case, there is no fitting of doors or drop tailgate to be done by the customer. The doors or drop tailgate are completely hung and fitted and all that remains is to put the rear section complete in place.

In Fig. 16 is shown a rear section corresponding to the side section of Fig. 10. In this case, the portions 26 and 27 are as before, but a tailgate 34 has replaced the doors 32.

In Fig. 17 is shown a rear section having a grille work 35 and a tailgate 34. This is a delivery type very frequently used.

In Figs. 18 and 19, the side curved portions of the rear section are supplemented by a narrow panel 36, and a single doorway 37 is provided. In such a construction, hand rails 38 are shown and a step 39 is hung from the section bottom. This is a police patrol type of body.

The body is now completed by the use of a top section G consisting of longerons 40 to the top of which are applied curved outside longitudinals 41. Upon a shoulder formed by the parts 40 and 41 I provide transversals 42 which support the stripping 43. Over the whole is a fabric covering 44 to make the same waterproof. A gutter 45 may be secured over the edge of the fabric 44 which serves to more securely hold the covering in place. The underside of the top at the front thereof is made to conform to the cab portion of the body as defined by the upper edges of the front door sections D and the windshield section C. These three parts and the two side sections E are secured to the top to make a rigid structure.

As in the case of the bottom, the top may be made in various lengths to suit the purpose for which needed.

Fig. 11 shows the general lay out of a body constructed for the parts above described in detail. The driver's seat is shown at 46.

From the foregoing it will be seen that various radically different types of sections A, B, C, D, E, F, and G may be used but in all cases the different types are clearly interchangeable. Obviously, all of the types have not been shown nor are those shown intended to be all that might be used. It will be seen that by an interchange of side section E of Fig. 10 and rear section F of Fig. 16 for the corresponding parts of Fig. 15, a closed cab but open body is provided.

In case of damage through accident, only those parts actually damaged need be replaced, which parts may be readily had from the manufacturer.

I have found that after such a body has been in use for a while, there is a tendency for the joint between sections to slightly separate. In order to prevent such an unsightly occurrence and to more securely hold the parts together and completely cover the joint, I provide a longitudinal strip as shown in Fig. 22. This strip consists of a continuous piece of metal bent upon itself longitudinally to form two spring beads 47 and 48 connected by a web 49. Such a joint strip may be used to advantage on the joint between door section D and side section E as shown in Fig. 6. In this case the end uprights of the sections D and E are indicated at 12 and 20 respectively, the web 49 lying therebetween and the two uprights secured together by the fastening member 19. Spring beading 47 effectively covers this line joint on the outside and 48 on the inside which gives a finished appearance to the body. This structure may likewise be used to cover the joint between sections C and D and between E and F.

Figure 23:
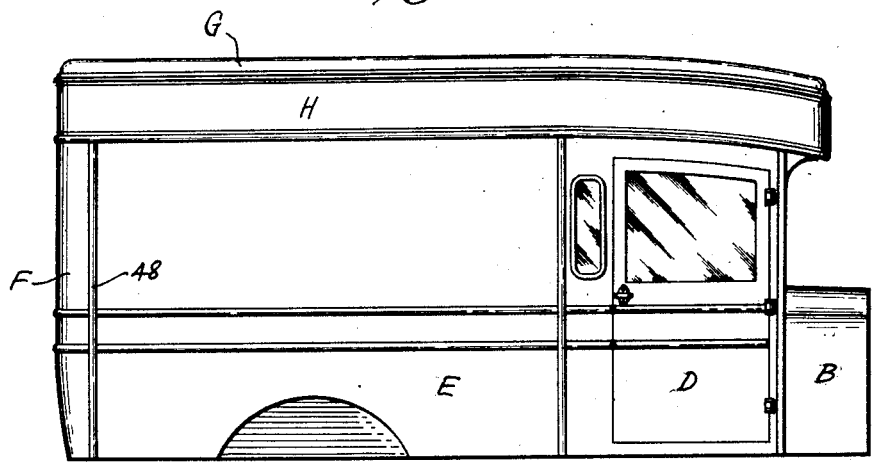
Fig. 23 is a view showing an elevating unit in place.
Figure 24:
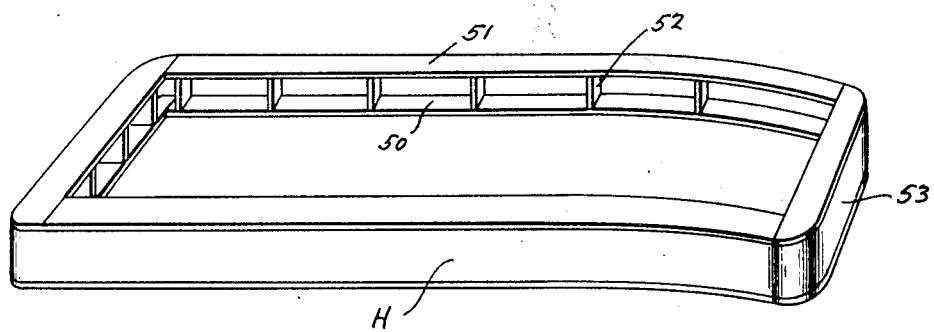
Fig. 24 is a perspective of the elevating unit.

In some instances I have found it desirable to use an elevating section or unit H, indicated in Figs. 23 and 24. This section consists of bottom and top portions 50 and 51 suitably spaced apart by spacers 52 and provided with an outer wall 53. This unit H is adapted to be supported directly upon the same units ordinarily supporting the top section or unit G. Upon the unit H, the top G rests, so that an increased loading height or head room is provided without increasing the height of the other units or sections. This section H is likewise interchangeable in all of the different types of body assemblies.

Sometimes, I have found that difficulty arises in fitting or squaring the rear end section F so that the doors line up properly.

Figure 25:
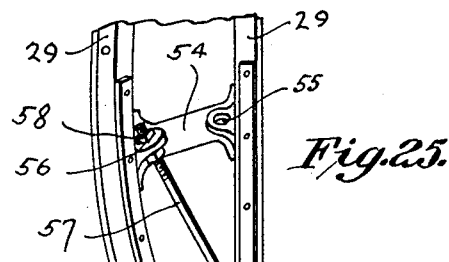
Fig. 25 is a view showing the method of bracing.

To obviate this difficulty I may use the instrumentalities shown in Fig. 25, in which a connecting web 54 is provided between wings 29, and ears having apertures 55 and 56 cast or otherwise secured to the wings. A brace rod 57 suitably socketed in the sill may be either swung through aperture 55 or 56 as required and a nut 58 used to draw the brace tight. The foot of the brace being held fast in the sill, the whole section may be moved slightly from two different directions in order to make the section F fit squarely.

I claim:

In combination in vehicle body structure comprising unit sections interchangeable with unit sections of different types, a bottom unit section comprising a flooring having main transversals and shorter transversals providing space for the wheels and having projections at its front end providing space therebetween to clear the engine, a cowl unit section having feet for attachment to said projections, a windshield section having depending spaced side members to embrace said cowl unit section, front door unit sections, side sections, removable wheel socket unit sections in the side sections, a rear closure unit section, rounded metal rear corner sections between the side and rear sections, and a top unit section, said corner sections being provided with wings to which portions of the side and rear sections are fastened, ears on said wings having apertures, a brace rod socketed in the sill for connection through either apertured ear and a nut for clamping said brace.

In testimony whereof I affix my signature.

EDWIN S. ZIEGLER.